United States Patent
Buddenbaum et al.

(10) Patent No.: US 9,652,531 B2
(45) Date of Patent: May 16, 2017

(54) PRIORITIZING WORK AND PERSONAL ITEMS FROM VARIOUS DATA SOURCES USING A USER PROFILE

(71) Applicant: International Business Machines Corporation, Armonk, NY (US)

(72) Inventors: Donald E. Buddenbaum, Raleigh, NC (US); Peter F. Haggar, Raleigh, NC (US); Heather M. Kreger, Louisburg, NC (US); Arnaud J. Le Hors, Santa Clara, CA (US); John V. Meegan, Ridgefield, CT (US); Keith A. Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 13/766,903

(22) Filed: Feb. 14, 2013

(65) Prior Publication Data

US 2014/0229492 A1    Aug. 14, 2014

(51) Int. Cl.
    *G06F 7/00*            (2006.01)
    *G06F 17/30*          (2006.01)
    *H04L 29/08*         (2006.01)

(52) U.S. Cl.
    CPC .. *G06F 17/30716* (2013.01); *G06F 17/30867* (2013.01); *H04L 67/10* (2013.01)

(58) Field of Classification Search
    None
    See application file for complete search history.

(56) References Cited

U.S. PATENT DOCUMENTS

| | | | |
|---|---|---|---|
| 6,611,842 B1 * | 8/2003 | Brown | |
| 6,625,595 B1 * | 9/2003 | Anderson et al. | |
| 6,636,853 B1 * | 10/2003 | Stephens, Jr. | |
| 8,312,096 B2 | 11/2012 | Cohen et al. | |
| 8,316,371 B2 * | 11/2012 | Chaffee et al. | 718/103 |
| 8,554,776 B1 * | 10/2013 | Barak et al. | 707/748 |

(Continued)

OTHER PUBLICATIONS

Office Action for U.S. Appl. No. 14/067,344 dated Sep. 12, 2014, pp. 1-14.

(Continued)

*Primary Examiner* — Syed Hasan
*Assistant Examiner* — Nicholas Allen
(74) *Attorney, Agent, or Firm* — Robert A. Voigt, Jr.; Winstead, P.C.

(57) ABSTRACT

A method, system and computer program product for managing work and personal items. Information is received from a user to populate a user profile providing rules to determine a priority for work and personal items to be addressed by the user. Work and personal data sources (e.g., e-mails, social media) are monitored. The content in these monitored data sources are scanned and analyzed for work and personal items to be addressed by the user. These work and personal items are then presented to the user in a prioritized order based on the rules in the user profile. In this manner, the user is able to effectively manage the various work and personal items from various data sources by receiving a prioritized list of work and personal items that need to be addressed based on various factors that the user deems to be important as provided in the user's profile.

14 Claims, 6 Drawing Sheets

(56) References Cited

U.S. PATENT DOCUMENTS

| | | | |
|---|---|---|---|
| 8,818,985 B2* | 8/2014 | Fischer et al. | 707/707 |
| 2002/0152224 A1* | 10/2002 | Roth et al. | 707/104.1 |
| 2005/0267770 A1* | 12/2005 | Banavar et al. | 705/1 |
| 2006/0156307 A1* | 7/2006 | Kunjithapatham et al. | 718/103 |
| 2007/0136731 A1* | 6/2007 | Bennington et al. | 718/103 |
| 2007/0274519 A1* | 11/2007 | Cohen et al. | 380/201 |
| 2008/0040457 A1* | 2/2008 | Nygard | 709/220 |
| 2010/0077400 A1* | 3/2010 | Ioannou | 718/104 |
| 2010/0262653 A1* | 10/2010 | Chaffee et al. | 709/203 |
| 2012/0239451 A1* | 9/2012 | Caligor | 705/7.21 |
| 2013/0007648 A1* | 1/2013 | Gamon et al. | 715/771 |

OTHER PUBLICATIONS

Office Action from U.S. Appl. No. 14/067,344 dated Jan. 23, 2015, pp. 1-22.

* cited by examiner

| What's next on my list | 503 | 504 | 505 | 506 ☒ ☒ |
|---|---|---|---|---|
| Type of Data Source | From | Subject | Due | Received |
| Meeting | | Projext X status | 03/09/12 4:00pm | |
| IM | Mary | Kids pick up | 03/09/12 5:00pm | 03/09/12 3:10pm |
| Text | Kathy | Dad, I need... | | 03/09/12 3:05pm |
| Facebook® | Mark | Meet for a coffee? | | 03/09/12 4:19pm |
| Task List | John | RFP | 03/09/12 5:30pm | |
| Email | John | Trip report | 03/10/12 9:00am | 03/05/12 10:07am |
| Email | John | Sales figures | | 03/06/12 2:25pm |
| ... | | | | |

FIG. 5

PRIORITIZING WORK AND PERSONAL ITEMS FROM VARIOUS DATA SOURCES USING A USER PROFILE

TECHNICAL FIELD

The present invention relates generally to communications, and more particularly to prioritizing work and personal items (e.g., actions, responses) from various data sources (e.g., e-mails, instant messages, calendar appointments, task lists, social media, text messages) using a user profile.

BACKGROUND

There are various forms of communication between users of a computing device, such as via electronic mail ("e-mail"), instant messaging, calendar appointments (e.g., meeting appointments), social media (e.g., social networking sites), text messaging, etc., that require an action or a response by the user. Other actions or responses required to be performed by the user may be stored in a task list (group of tasks to be completed). Such actions or responses required to be performed may include both personal and work items, such as responding to an e-mail from a boss, responding to an instant message from the user's spouse, responding to a child's text message, etc. These actions or responses may include both personal and work items since users interact with other users in both a work and a personal context. For instance, a user may have a work and a personal e-mail account, a work and a personal instant messaging account, a work and a personal calendar, a work and a personal task list, etc. In addition, the user may interact with other users in both a work and a personal context using various social media. For instance, the user may interact with family and friends using Facebook® while communicating with professional colleagues using LinkedIn®.

Currently, keeping track of items, both work and personal, that require attention from these various sources can be challenging, if not impossible. Furthermore, there is not currently a mechanism for prioritizing such items that may depend on various factors, such as the day, the time of day, the individual requesting an action to be performed, etc.

BRIEF SUMMARY

In one embodiment of the present invention, a method for managing work and personal items comprises receiving information to populate a user profile providing rules to determine a priority for work and personal items to be addressed. The method further comprises monitoring work and personal data sources. Additionally, the method comprises scanning content in the monitored work and personal data sources. Furthermore, the method comprises analyzing the scanned content for work and personal items to be addressed. The method additionally comprises determining a priority for each of the work and personal items to be addressed based on the rules in the user profile. In addition, the method comprises presenting, by a processor, the work and personal items to be addressed to a user in a prioritized order based on the prioritization.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for managing work and personal items. In one embodiment of the present invention, information is received from a user to populate a user profile providing rules to determine a priority for work and personal items to be addressed by the user. Work and personal data sources, such as but not limited to, e-mails, calendars, instant messages, task lists, social media, text messages, etc., are monitored. The content in these monitored work and personal data sources are scanned and analyzed for work and personal items to be addressed by the user. A priority for each of these work and personal items (e.g., responding to an e-mail from a boss, responding to an instant message from the user's spouse) is determined based on the rules in the user profile. These work and personal items are then presented to the user in a prioritized order based on the prioritization. In this manner, the user is able to effectively manage the various work and personal items from various data sources by receiving a prioritized list of work and personal items that need to be addressed based on various factors that the user deems to be important as provided in the user's profile.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
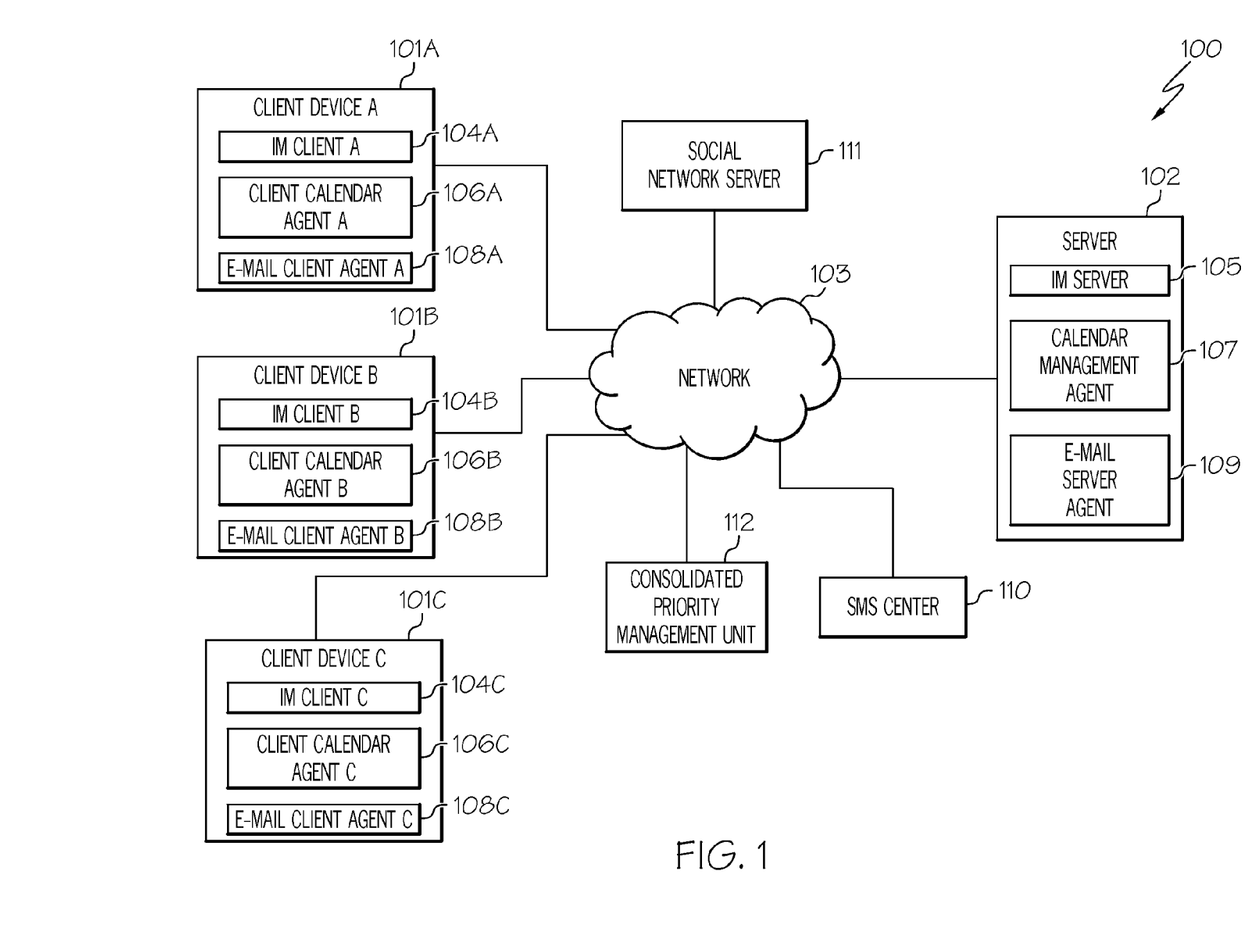
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client device 101 may be configured to send and receive text-based messages in real-time during an instant messaging session. Any user of client device 101 may be the creator or initiator of an instant message (message in instant messaging) and any user of client device 101 may be a recipient of an instant message. Furthermore, client device 101 may be configured to send out calendar appointments or meeting notices/invitations to other client devices 101 using a calendar application via network 103. Any user of client device 101 may be the creator or initiator of a meeting invitation and any user of client device 101 may be a recipient of a meeting invitation. Additionally, client device 101 may be configured to create, receive and send e-mails. Furthermore, client device 101 may be configured to send and receive text messages, such as Short Message Services (SMS) messages.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, client devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for client device 101 to connect to the IM server 105 which provides the functionality of distributing the instant messages to the IM clients 104 associated with each of the sharing users.

Client devices 101A-101C may further include a software agent, referred to herein as a client calendar agent 106A-106C, respectively. Client calendar agents 106A-106C may collectively or individually be referred to as client calendar agents 106 or client calendar agent 106, respectively. Furthermore, server 102 may include a software agent, referred to herein as the calendar management agent 107. Calendar management agent 107 interfaces with client calendar agent 106 to present meeting invitations to client devices 101. Client calendar agent 106 is configured to display the received meeting invitation as well as display calendar schedule information on the client device's 101 calendar user interface.

Furthermore, client devices 101A-101C may include a software agent, referred to herein as an e-mail client agent 108A-108C, respectively. E-mail client agents 108A-108C may collectively or individually be referred to as e-mail client agents 108 or e-mail client agent 108, respectively. Furthermore, server 102 may include a software agent, referred to herein as the e-mail server agent 109. E-mail client agent 108 enables the user of client device 101 to create, send and receive e-mails. E-mail server agent 109 is configured to receive e-mail messages from client devices 101 and distribute the received e-mail messages among the one or more client devices 101.

While the preceding discusses each client device 101 as including an IM client 104, a client calendar agent 106 and an e-mail client agent 108, each client device 101 may not necessarily include each of these software agents. For example, some client devices 101 may only include an IM client 104; whereas, other client devices 101 may only include a client calendar agent 106 and an e-mail client agent 108. In other words, each client device 101 may be able to perform some or all of the functions discussed herein, such as sending/receiving e-mails, sending/receiving instant messages, sending/receiving text messages, sending/receiving calendar appointments, etc. Furthermore, while the preceding discusses a single server 102 including the software agents, such as IM server 105, calendar management agent 107 and e-mail server agent 109, multiple servers may be used to implement these services. Furthermore, each server 102 may not necessarily be configured to include all of these software agents, but only a subset of these software agents. For example, one particular server 102 may only include IM server 105; whereas, another particular server 102 may only include calendar management agent 107.

System 100 further includes a Short Message Service (SMC) center 110 configured to relay, store and forward text messages, such as SMS messages, among client devices 101 through network 103.

System 100 further includes a social network server 111, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 111 is connected to network 103 by wire or wirelessly. While FIG. 1 illustrates a single social network server 111, it is noted for clarity that multiple servers may be used to implement the social networking and/or microblogging service.

System 100 further includes a consolidated priority management unit 112 connected to network 103 by wire or wirelessly. Consolidated priority management unit 112 is configured to manage the work and personal items from the various data sources (e.g., e-mails, calendars, instant messages, task lists, social media, text messages) by displaying a priority list of work and personal items (e.g., responding to an e-mail from a boss, responding to an instant message from the user's spouse) that need to be addressed by the user (user of client device 101) as discussed in further detail below. A description of the hardware configuration of consolidated priority management unit 112 is provided below in connection with FIG. 2.

System 100 is not to be limited in scope to any one particular network architecture. System 100 may include any number of client devices 101, servers 102, networks 103, SMS centers 110, social network servers 111 and consolidated priority management units 112.

Figure 2:
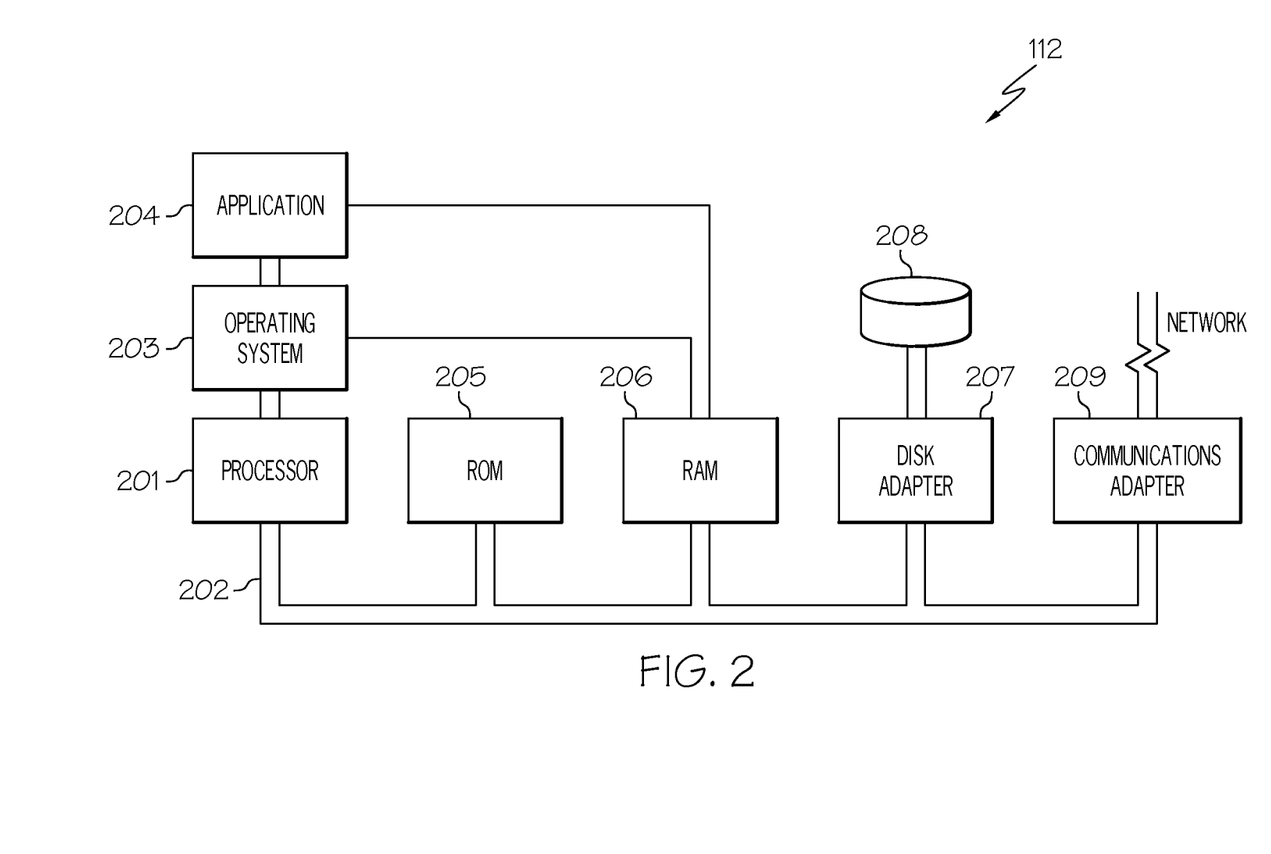
FIG. 2 illustrates a hardware configuration of a consolidated priority management unit in accordance with an embodiment of the present invention.

Referring now to FIG. 2, FIG. 2 illustrates a hardware configuration of consolidated priority management unit 112 (FIG. 1) which is representative of a hardware environment for practicing the present invention. Referring to FIG. 2, consolidated priority management unit 112 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for managing the user's work and personal items (managing the work and personal items for the user of client device 101 of FIG. 1) from the various data sources (e.g., e-mails, calendars, instant messages, task lists, social media, text messages) by displaying a priority list of work and personal items that need to be addressed by the user as discussed further below in association with FIGS. 3, 4A-4B and 5.

Referring again to FIG. 2, read-only memory ("ROM") 205 is coupled to system bus 202 and includes a basic input/output system ("BIOS") that controls certain basic functions of consolidated priority management unit 112. Random access memory ("RAM") 206 and disk adapter 207 are also coupled to system bus 202. It should be noted that software components including operating system 203 and application 204 may be loaded into RAM 206, which may be consolidated priority management unit's 112 main memory for execution. Disk adapter 207 may be an integrated drive electronics ("IDE") adapter that communicates with a disk unit 208, e.g., disk drive. It is noted that the program for managing the user's work and personal items from the various data sources by displaying a priority list of work and personal items that need to be addressed by the user, as discussed further below in association with FIGS. 3, 4A-4B and 5, may reside in disk unit 208 or in application 204.

Consolidated priority management unit 112 may further include a communications adapter 209 coupled to bus 202. Communications adapter 209 interconnects bus 202 with an outside network (network 103 of FIG. 1) thereby enabling consolidated priority management unit 112 to communicate with client devices 101, server 102, SMS center 110 and social network server 111.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, there are various forms of communication between users of a computing device, such as via electronic mail ("e-mail"), instant messaging, calendar appointments (e.g., meeting appointments), social media (e.g., social networking sites), text messaging, etc., that require an action or a response by the user. Other actions or responses required to be performed by the user may be stored in a task list (group of tasks to be completed). Such actions or responses required to be performed may include both personal and work items, such as responding to an e-mail from a boss, responding to an instant message from the user's spouse, responding to a child's text message, etc. These actions or responses may include both personal and work items since users interact with other users in both a work and a personal context. For instance, a user may have a work and a personal e-mail account, a work and a personal instant messaging account, a work and a personal calendar, a work and a personal task list, etc. In addition, the user may interact with other users in both a work and a personal context using various social media. For instance, the user may interact with family and friends using Facebook® while communicating with professional colleagues using LinkedIn®. Currently, keeping track of items, both work and personal, that require attention from these various sources can be challenging, if not impossible. Furthermore, there is not currently a mechanism for prioritizing such items that may depend on various factors, such as the day, the time of day, the individual requesting an action to be performed, etc.

Figure 3:
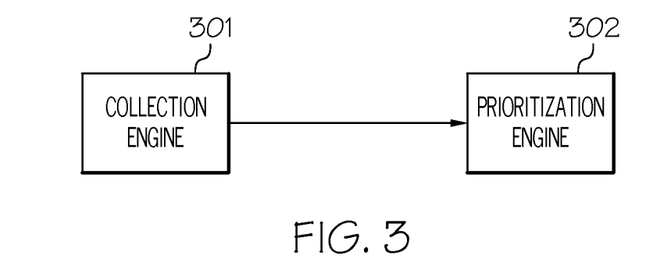
FIG. 3 illustrates the software components used in prioritizing the work and personal items from the various data sources that need to be addressed by the user based on various factors provided in the user profile in accordance with an embodiment of the present invention.
Figure 4A:
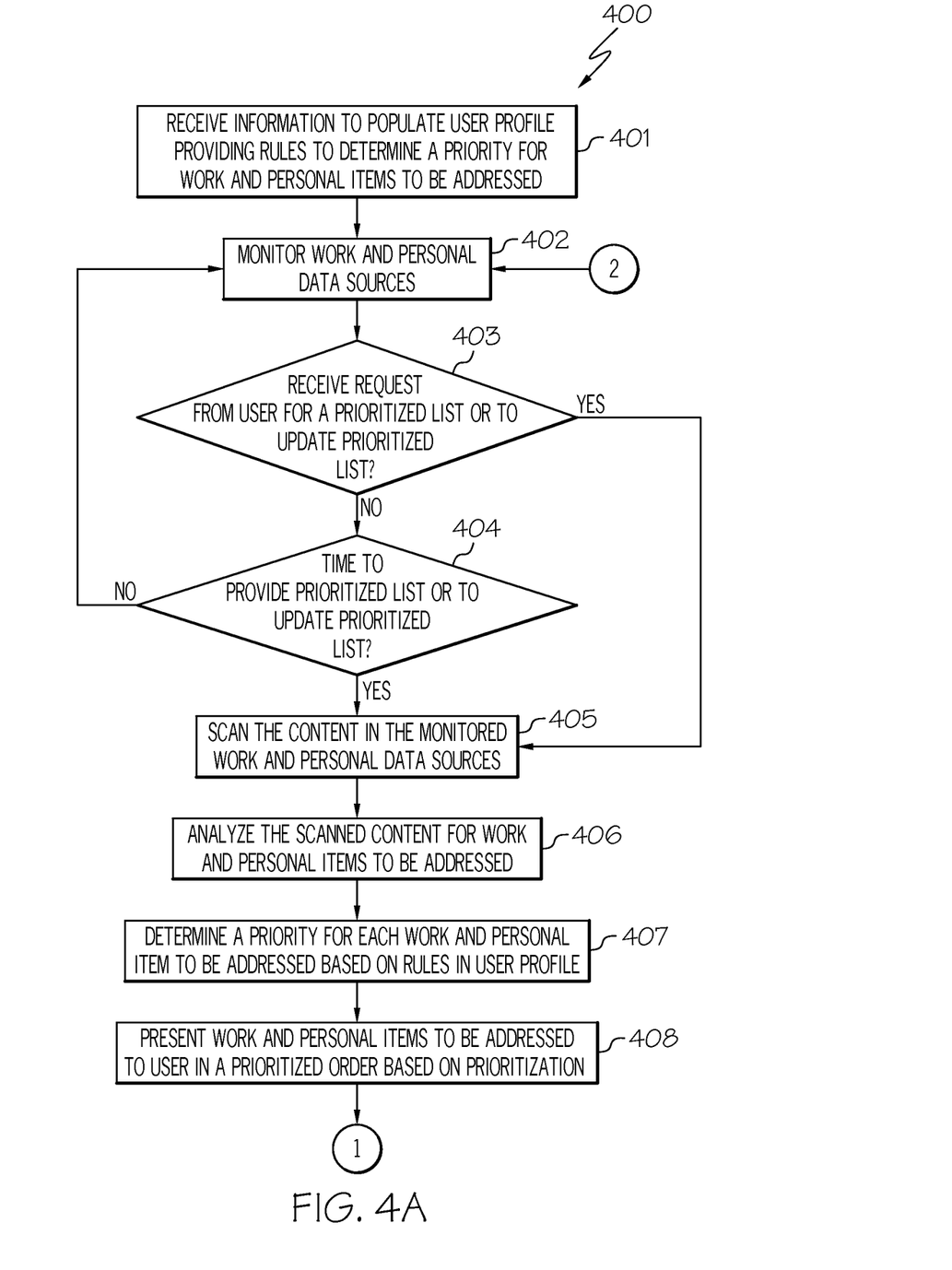
FIGS. 4A-4B are a flowchart of a method for prioritizing work and personal items from various data sources that need to be addressed by the user based on various factors provided in the user profile in accordance with an embodiment of the present invention.
Figure 4B:
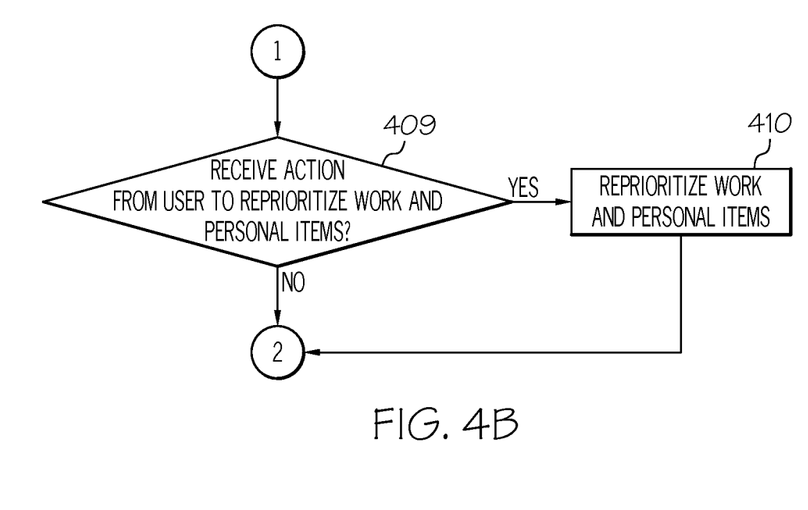
Figure 5:
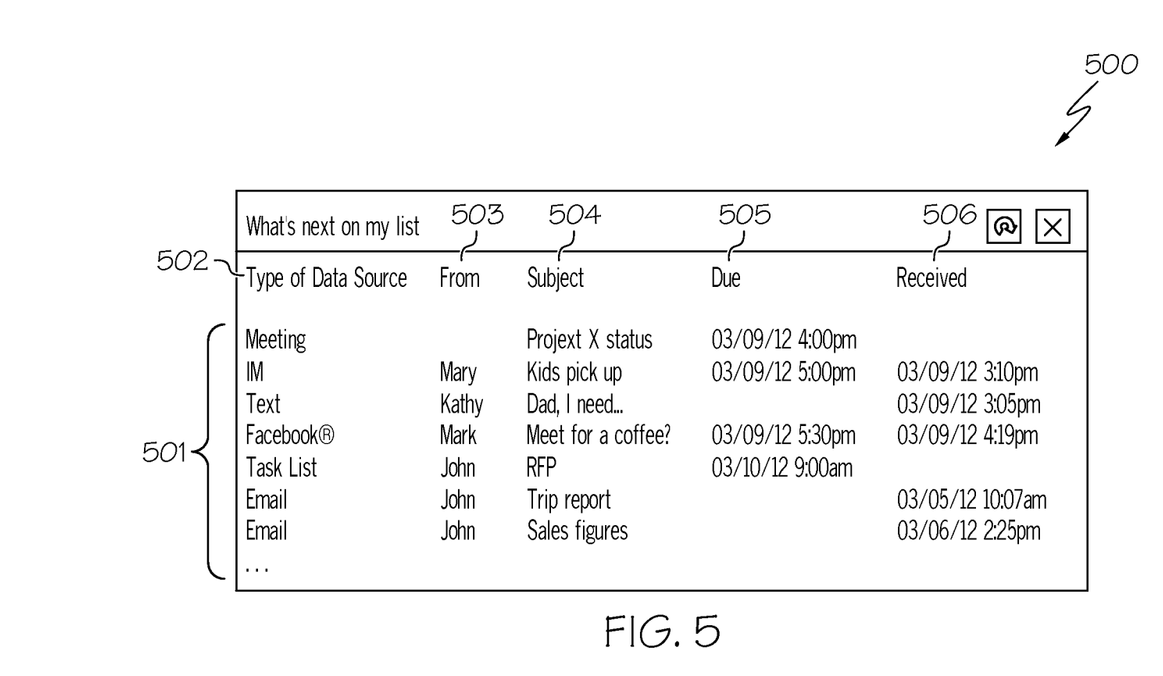
FIG. 5 illustrates a prioritized list of work and personal items using the principles of the present invention in accordance with an embodiment of the present invention.

The principles of the present invention provide a means for prioritizing work and personal items from various data sources (e.g., e-mails, calendars, instant messages, task lists, social media and text messages) that need to be addressed by the user based on various factors provided in a user profile as discussed further below in connection with FIGS. 3, 4A-4B and 5. FIG. 3 illustrates the software components used in prioritizing the work and personal items from the various data sources that need to be addressed by the user based on various factors provided in the user profile. FIGS. 4A-4B are a flowchart of a method for prioritizing work and personal items from various data sources that need to be addressed by the user based on various factors provided in the user profile. FIG. 5 illustrates a prioritized list of work and personal items using the principles of the present invention.

Referring to FIG. 3, as stated above, FIG. 3 illustrates the software components used in prioritizing work and personal items from various data sources that need to be addressed by the user based on various factors provided in a user profile in accordance with an embodiment of the present invention. In one embodiment, these software components are the components or modules of the program for managing the user's work and personal items from the various data sources by displaying a priority list of work and personal items that need to be addressed by the user, where the program may reside in application 204 (FIG. 2).

The following provides a brief description of these software components. A more detailed description of these software components is provided below in conjunction with FIGS. 4A-4B and 5, where their functionalities are discussed in connection with the method for prioritizing work and personal items from various data sources that need to be addressed by the user based on various factors provided in the user profile.

Referring again to FIG. 3, the software components include a collection engine 301 configured to monitor the work and personal data sources, such as but not limited to, e-mails, calendars, instant messages, task lists, social media, text messages, etc. that may arise from the user's personal and work accounts.

The software components further include a prioritization engine 302 configured to scan and analyze the content in the monitored work and personal data sources to identify the work and personal items to be addressed. In one embodiment, prioritization engine 302 may identify the work and personal items to be addressed based on identifying key words/phrases in the data sources (e.g., "let me know by tomorrow," "due by," "respond by," "answer needed by"), detecting questions marks in the data sources or detecting words that indicate a question in the data sources (e.g., a sentence that begins with one of the following terms: "Who," "What," "When," "Where," "Why," and "How") that may indicate a more urgent response or action required by the user.

Upon identifying the work and personal items to be addressed by the user of client device 101, prioritization engine 302 determines a priority for these work and personal items based on the rules as established in a user profile. A user profile, as used herein, refers to a data structure that stores information provided by the user that is used to determine a priority associated with the work and personal items. Work and personal items, as used herein, refer to any response or action that is required by the user to perform from the monitored work and personal data sources in both the user's work and personal context. In one embodiment, the user profile may reside in memory or data storage of consolidated priority management unit 112 (FIG. 1) or in a database (not shown) connected to consolidated priority management unit 112. In one embodiment, the user profile includes rules that determine the priority of the work and personal items based on one or more of the following: a time period, a status, an importance, an urgency, a requestor, a deadline, a social hierarchy, a current date/time/hour, a difficulty, and a predetermined schedule. For example, the user may indicate in the user's profile that the top priority sources for the time period of 7:00 am-4:00 pm during the weekdays are: work calendar, work e-mails, work instant messages and work task lists. In another example, the user may indicate in the user's profile that e-mails during working hours have the following priority: boss and his/her superiors, team lead, co-workers, and all others. In a further example, the user may designate an importance to a task. In another example, the user may designate a degree of difficulty in completing a task. In a further example, the user may designate that work data sources are to be examined from 8:00 pm on Sunday through 4:00 pm on Friday and that personal data sources are to be examined from 4:00 pm on Friday through 8:00 pm on Sunday and that text messages are to be examined always. In another example, the user indicates that during the workdays, the people have the following priority: boss, spouse, family, team lead, best friend and co-workers and during the weekend, family and friends have the highest priority. The rules of the user profile are not to be limited in scope to the exemplary rules discussed above but to include any rules that may be used to determine a priority associated with the work and personal items.

Upon determining a priority for the work and personal items, prioritization engine 302 presents the work the personal items to be addressed to the user of client device 101 in an order based on the prioritization. Prioritization engine 302 may present the work and personal items to be addressed to the user in a prioritized order using various means, such as an alert, an e-mail, a pop-up, a menu, a notification, etc. In this manner, the user is able to effectively manage the various work and personal items by receiving a prioritized list of work and personal items that need to be addressed based on various factors that the user deems to be important as provided in the user's profile.

Furthermore, the prioritized list provided to the user is in real-time in that the prioritized list takes into consideration the current conditions (e.g., current time of day) and current rules provided by the user in the user's profile. Furthermore, the prioritized list is dynamic in that the prioritized list changes depending on the current conditions and current rules as discussed further below in connection with FIGS. 4A-4B.

FIGS. 4A-4B are a flowchart of a method 400 for prioritizing work and personal items from various data sources that need to be addressed by the user based on various factors provided in the user profile in accordance with an embodiment of the present invention.

Referring to FIG. 4A, in conjunction with FIGS. 1-3, in step 401, consolidated priority management unit 112 receives information to populate a user profile providing the rules to determine a priority for work and personal items to be addressed by the user of client device 101. Consolidated priority management unit 112 may receive various types of information from the user to populate the user profile with rules to determine a priority for work and personal items to be addressed. Such rules may be based on factors, such as, a time period, a status, an importance, an urgency, a requestor, a deadline, a social hierarchy, a current date/time/hour, a difficulty, and a predetermined schedule. For example, the rules of the user profile may include options, such as: (1) the top priority sources are: work calendar, work e-mails, work instant messages and work task lists from 7:00 am-4:00 pm during the weekdays; (2) the top priority sources are: personal calendar, personal e-mails, personal instant messages and personal task lists from 4:01 pm on Friday through Sunday at 8:00 pm; (3) e-mails during the working hours have the following priority: boss and his/her superiors, team lead, co-workers and all others; and (4) instant messages have the following priority during all times: boss and spouse, co-workers, close friends, and all others.

In step 402, collection engine 301 monitors the work and personal data sources, such as but not limited to, e-mails, calendars, instant messages, task lists, social media, text messages, etc. that may arise from the user's personal and work accounts.

In step 403, a determination is made by consolidated priority management unit 112 as to whether it received a request from the user for a prioritized list or to update the prioritized list of work and personal items that need to be addressed. In this manner, the user may be able to receive a prioritized list or an updated prioritized list of work and personal items that need to be addressed at a time determined by the user.

If consolidated priority management unit 112 does not receive a request from the user for a prioritized list or to update the prioritized list of work and personal items that need to be addressed, then, in step 404, a determination is made by consolidated priority management unit 112 as to whether it is time to provide a prioritized list or to update the prioritized list of work and personal items that need to be addressed. In one embodiment, consolidated priority management unit 112 provides a prioritized list of the work and personal items that need to be addressed by the user or updates such a prioritized list on a predetermined schedule (e.g., hourly, daily, weekly).

If it is not time to provide a prioritized list or to update the prioritized list of work and personal items that need to be addressed, then collection engine 301 continues to monitor the work and personal data sources in step 402.

If, however, consolidated priority management unit 112 receives a request from the user for a prioritized list or to update the prioritized list of work and personal items that need to be addressed or it is time to provide a prioritized list or to update the prioritized list of work and personal items that need to be addressed, then, in step 405, prioritization engine 302 scans the content in the monitored work and personal data sources.

In step 406, prioritization engine 302 analyzes the scanned content for work and personal items to be addressed by the user of client device 101. In analyzing the scanned content for work and personal items to be addressed by the user of client device 101, prioritization engine 302 may identify the work and personal items to be addressed based on identifying key words/phrases in the data sources (e.g., "let me know by tomorrow," "due by," "respond by," "answer needed by"), detecting questions marks in the data sources or detecting words that indicate a question in the data sources (e.g., a sentence that begins with one of the following terms: "Who," "What," "When," "Where," "Why," and "How") that may indicate a more urgent response or action required by the user.

In step 407, prioritization engine 302 determines a priority for each of the work and personal items to be addressed by the user based on the rules in the user profile as discussed above.

In step 408, prioritization engine 302 presents the work and personal items to be addressed in a prioritized order based on the prioritization of step 407. Prioritization engine 302 may present the work and personal items to be addressed to the user of client device 101 in various manners, such as via an alert, an e-mail, a pop-up, a menu, a notification, etc. In this manner, the user is able to effectively manage the various work and personal items by receiving a prioritized list of work and personal items that need to be addressed based on various factors that the user deems to be important as provided in the user's profile.

For example, suppose that collection engine 301 monitors the work and personal data sources during a workday and identifies the following information sources when the user requests a prioritized list of work and personal items that need to be addressed after the user returns from lunch: a task list from the user's boss, John, regarding a request for proposal that is due the next day at 9:00 am; an e-mail from the user's boss, John, regarding a trip report; an e-mail from the user's boss, John, regarding sales figures; a calendar appointment for a meeting with the user's team lead regarding the status of a project, Project X, that will take place today at 4:00 pm; an instant message from the user's wife, Mary, that the user has not yet responded; a text message from the user's child, Kathy, that the user has not yet responded; and a wall post on the user's profile page from the user's friend, Mark, regarding meeting up for coffee at 5:30 pm today, that the user has not yet responded.

Suppose further that the rules established by the user in the user's profile provide the following priorities for the requestors of work and personal items on workdays: (1) boss, spouse and family members; (2) team lead; (3) best friend; and (4) co-workers. Additionally, suppose further that the rules in the user's profile indicate that all meetings that are to occur within a twenty-four hour period from the current date/time are to be high priority items. Based on the rules as established by the user's profile, prioritization engine 302 presents the work and personal items in a prioritized list, such as from most important to least important, to the user as illustrated in FIG. 5.

FIG. 5 illustrates a prioritized list 500 of work and personal items using the principles of the present invention in accordance with an embodiment of the present invention.

Referring to FIG. 5, the prioritized list 500 includes a listing of work and personal items 501 that is displayed on the user interface of the user's client device 101. In one embodiment, list 500 includes various information, such as the type of data source 502, the sender of the work or personal item 503 (identified as "From" in FIG. 5), the subject matter of the work or personal item 504 (identified as "Subject" in FIG. 5), the deadline to respond or perform the work or personal item 505 (identified as "Due" in FIG. 5) and the date the user received the work or personal item 506 (identified as "Received" in FIG. 5). Prioritized list 500 may include other information concerning the prioritized list of work and personal items that need to be addressed by the user and is not to be limited in scope to the depicted elements.

Referring to the example discussed above, prioritized list 500 first lists the calendar appointment for the meeting with the user's team lead regarding the status of a project, Project X, that will take place today at 4:00 pm. Since meetings that are to occur within a twenty-four hour period from the current date/time are to be given highest priority, it was the first listed item. The following items listed in prioritized list 500 include an instant message from the user's wife, Mary, and a text message from the user's child, Kathy. A wall post on the user's profile page from the user's best friend, Mark, was next listed ahead of the task list assigned by the user's boss, John, and the e-mails received from the user's boss, since Mark wants to meet the user at 5:00 pm today.

Referring now to FIG. 4B, in conjunction with FIGS. 1-3, in step 409, a determination is made by consolidated priority management unit 112 regarding whether it received an action from the user to reprioritize the work and personal items. Such actions may include changing, adding, adjusting and deleting a rule of the user's profile and/or a work/personal item to be addressed. For example, the user may delete a work or personal item presented to the user if the user completed the requested task. In another example, the user may lower the priority of the work/personal item presented to the user if the user believes that it is less important than other items. In a further example, the user may modify the time frame that e-mails from the user's boss are to have high priority from only during the weekdays to all times.

If consolidated priority management unit 112 did not receive any action from the user to reprioritize the work and personal items, then collection engine 301 continues to monitor the work and personal data sources in step 402.

If, however, consolidated priority management unit 112 did receive an action from the user to reprioritize the work and personal items, then, in step 410, consolidated priority management unit 112 reprioritizes the work and personal items accordingly. By reprioritizing the work and personal items in real-time, the prioritized list is dynamically updated reflecting the changes to the current conditions and rules.

Upon reprioritizing the work and personal items, collection engine 301 continues to monitor the work and personal data sources in step 402.

In some implementations, method 400 may include other and/or additional steps that, for clarity, are not depicted. Further, in some implementations, method 400 may be executed in a different order presented and that the order presented in the discussion of FIGS. 4A-4B is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for managing work and personal items, the computer program product comprising the programming instructions for:
   receiving information to populate a user profile providing rules to determine a priority for work and personal items to be addressed;
   monitoring work and personal data sources;
   scanning content in said monitored work and personal data sources;
   analyzing said scanned content for work and personal items to be addressed;
   determining a priority for each of said work and personal items to be addressed based on said rules in said user profile; and
   presenting said work and personal items to be addressed to a user in a prioritized order based on said prioritization.

2. The computer program product as recited in claim 1, wherein said work and personal data sources comprise one or more of the following: e-mails, calendars, instant messages, task lists, social media and text messages.

3. The computer program product as recited in claim 1 further comprising the programming instructions for:
   receiving an action from said user to reprioritize said work and personal items to be addressed; and
   reprioritizing said work and personal items to be addressed in response to said action.

4. The computer program product as recited in claim 3, wherein said action comprises one or more of the following: changing, adding, adjusting and deleting a rule of said user profile and/or an item of said work and personal items to be addressed.

5. The computer program product as recited in claim 1, wherein said work and personal items to be addressed are presented to said user via one or more of the following: an alert, an e-mail, a pop-up, a menu, and a notification.

6. The computer program product as recited in claim 1, wherein said rules provided by said user profile are based on one or more of the following: a time period, a status, an importance, an urgency, a requestor, a deadline, a social hierarchy, a current date/time/hour, a difficulty, and a predetermined schedule.

7. The computer program product as recited in claim 1 further comprising the programming instructions for:
  presenting said work and personal items to be addressed to said user in said prioritized order in response to said user requesting a prioritized list of said work and personal items to be addressed.

8. A system, comprising:
  a memory unit for storing a computer program for managing work and personal items; and
  a processor coupled to said memory unit, wherein said processor, responsive to said computer program, comprises:
    circuitry for receiving information to populate a user profile providing rules to determine a priority for work and personal items to be addressed;
    circuitry for monitoring work and personal data sources;
    circuitry for scanning content in said monitored work and personal data sources;
    circuitry for analyzing said scanned content for work and personal items to be addressed;
    circuitry for determining a priority for each of said work and personal items to be addressed based on said rules in said user profile; and
    circuitry for presenting said work and personal items to be addressed to a user in a prioritized order based on said prioritization.

9. The system as recited in claim 8, wherein said work and personal data sources comprise one or more of the following: e-mails, calendars, instant messages, task lists, social media and text messages.

10. The system as recited in claim 8, wherein said processor further comprises:
  circuitry for receiving an action from said user to reprioritize said work and personal items to be addressed; and
  circuitry for reprioritizing said work and personal items to be addressed in response to said action.

11. The system as recited in claim 10, wherein said action comprises one or more of the following: changing, adding, adjusting and deleting a rule of said user profile and/or an item of said work and personal items to be addressed.

12. The system as recited in claim 8, wherein said work and personal items to be addressed are presented to said user via one or more of the following: an alert, an e-mail, a pop-up, a menu, and a notification.

13. The system as recited in claim 8, wherein said rules provided by said user profile are based on one or more of the following: a time period, a status, an importance, an urgency, a requestor, a deadline, a social hierarchy, a current date/time/hour, a difficulty, and a predetermined schedule.

14. The system as recited in claim 8, wherein said processor further comprises:
  circuitry for presenting said work and personal items to be addressed to said user in said prioritized order in response to said user requesting a prioritized list of said work and personal items to be addressed.

* * * * *